(12) United States Patent
Bergeal et al.

(10) Patent No.: US 11,401,852 B2
(45) Date of Patent: Aug. 2, 2022

(54) IN-EXHAUST ELECTRICAL ELEMENT FOR NOX STORAGE CATALYST AND SCR SYSTEMS

(71) Applicant: Johnson Matthey Public Limited Company, London (GB)

(72) Inventors: David Bergeal, Royston (GB); Nicholas Dunkley, Royston (GB); Daniel Hatcher, Royston (GB); Andrew Izzard, Royston (GB); Paul Phillips, Royston (GB)

(73) Assignee: Johnson Matthey Public Limited Company, London (GB)

( * ) Notice: Subject to any disclaimer, the term of this patent is extended or adjusted under 35 U.S.C. 154(b) by 0 days.

(21) Appl. No.: 16/545,240

(22) Filed: Aug. 20, 2019

(65) Prior Publication Data

US 2019/0376424 A1    Dec. 12, 2019

Related U.S. Application Data

(63) Continuation of application No. 15/472,642, filed on Mar. 29, 2017, now abandoned.

(60) Provisional application No. 62/315,985, filed on Mar. 31, 2016.

(51) Int. Cl.
| | |
|---|---|
| *F01N 3/08* | (2006.01) |
| *F01N 3/20* | (2006.01) |
| *F01N 9/00* | (2006.01) |
| *F01N 3/035* | (2006.01) |
| *F01N 13/00* | (2010.01) |

(Continued)

(52) U.S. Cl.
CPC ......... *F01N 3/0814* (2013.01); *F01N 3/0842* (2013.01); *F01N 3/2006* (2013.01); *F01N 3/206* (2013.01); *F01N 3/2013* (2013.01); *F01N 3/2066* (2013.01); *F01N 9/00* (2013.01); *F01N 9/002* (2013.01); *F01N 3/035* (2013.01); *F01N 3/0807* (2013.01); *F01N 3/106* (2013.01); *F01N 3/2026* (2013.01); *F01N 3/2892* (2013.01); *F01N 13/009* (2014.06); *F01N 2240/16* (2013.01); *F01N 2240/20* (2013.01); *F01N 2240/40* (2013.01); *F01N 2250/02* (2013.01); *F01N 2250/12* (2013.01); *F01N 2590/11* (2013.01); *F01N 2610/02* (2013.01); *F01N 2900/1404* (2013.01); *Y02A 50/20* (2018.01); *Y02T 10/12* (2013.01); *Y02T 10/40* (2013.01)

(58) Field of Classification Search
CPC combination set(s) only.
See application file for complete search history.

(56) References Cited

U.S. PATENT DOCUMENTS

| | | | | |
|---|---|---|---|---|
| 5,996,338 A | * | 12/1999 | Hirota | B01D 53/9495 60/285 |
| 6,729,125 B2 | * | 5/2004 | Suga | F01N 3/0814 60/285 |

(Continued)

FOREIGN PATENT DOCUMENTS

| | | | | |
|---|---|---|---|---|
| CN | 103912345 A | | 7/2014 | |
| JP | 2000073743 A | * | 3/2000 | F01N 3/08 |

(Continued)

*Primary Examiner* — Binh Q Tran

(57) ABSTRACT

An exhaust system comprising: a NOx storage catalyst; an electric heating element; and a NOx reduction catalyst wherein the heating element is located downstream of the NOx storage catalyst.

5 Claims, 5 Drawing Sheets

(51) Int. Cl.
*F01N 3/10* (2006.01)
*F01N 3/28* (2006.01)

(56) References Cited

U.S. PATENT DOCUMENTS

| | | | |
|---|---|---|---|
| 6,869,573 B2 * | 3/2005 | Abe | F01N 3/2013 |
| | | | 422/180 |
| 8,661,790 B2 * | 3/2014 | Gonze | F01N 3/2033 |
| | | | 60/286 |
| 8,813,478 B2 | 8/2014 | Gonze et al. | |
| 8,899,027 B2 | 12/2014 | Roos et al. | |
| 9,221,017 B2 | 12/2015 | Nakano et al. | |
| 9,856,774 B2 * | 1/2018 | Di Perna | B01D 53/9431 |
| 10,480,369 B1 * | 11/2019 | Dahodwala | F01N 3/106 |
| 2007/0017587 A1 | 1/2007 | Groschel et al. | |
| 2008/0112872 A1 | 5/2008 | Bruck | |
| 2008/0307774 A1 | 12/2008 | Gonze et al. | |
| 2009/0266061 A1 * | 10/2009 | Takenaka | F01N 3/0814 |
| | | | 60/295 |
| 2010/0115927 A1 | 5/2010 | Sano et al. | |
| 2010/0229535 A1 | 5/2010 | Theis et al. | |
| 2012/0255279 A1 * | 10/2012 | Atluri | F01N 3/027 |
| | | | 60/274 |
| 2012/0308439 A1 | 12/2012 | Chen et al. | |
| 2013/0111886 A1 * | 5/2013 | Gonze | F01N 3/2033 |
| | | | 60/286 |
| 2013/0186064 A1 | 7/2013 | Mehta | |
| 2015/0013309 A1 * | 1/2015 | Upadhyay | F01N 3/208 |
| | | | 60/274 |
| 2015/0143798 A1 | 5/2015 | Lee | |
| 2015/0273452 A1 * | 10/2015 | Chiffey | B01J 37/0246 |
| | | | 423/213.5 |
| 2015/0275730 A1 | 10/2015 | Gupta et al. | |

FOREIGN PATENT DOCUMENTS

| | | | | |
|---|---|---|---|---|
| JP | 2008261295 A | 10/2008 | | |
| JP | 2008280949 A | 11/2008 | | |
| JP | 2009503326 A | 1/2009 | | |
| JP | 2009503386 A | 1/2009 | | |
| JP | 2012021488 A | 2/2012 | | |
| JP | 2012127307 A * | 7/2012 | | F01N 3/20 |
| JP | 2013238219 A1 | 11/2013 | | |
| JP | 2014519975 A | 8/2014 | | |
| JP | 5884920 B2 | 3/2016 | | |
| JP | 2019157739 A * | 9/2019 | | F01N 3/28 |

* cited by examiner

IN-EXHAUST ELECTRICAL ELEMENT FOR NOX STORAGE CATALYST AND SCR SYSTEMS

BACKGROUND OF THE INVENTION

An exhaust gas purification device that utilizes a selective catalytic reduction (SCR) catalyst or selective catalytic reduction catalyst on a filter (SCRF) disposed on the exhaust passage of the internal combustion engine is commonly used. Generally, the catalyst used in such purification devices is able to purify pollutants in the exhaust gas only when the temperature of the catalyst becomes higher than a certain temperature, i.e., the catalysts in the converter do not work when the temperature is lower than the activating temperature of the catalyst.

Usually, the catalyst in the purification device is gradually heated by the exhaust gas and reaches the activating temperature after the engine starts. However, when the temperature of the engine is low, for example, after a cold start of the engine, it may take a long time to heat the catalyst to the activating temperature because the heat of the exhaust gas may be removed by the cold wall of the exhaust passage before it reaches the converter. Therefore, in a cold start of the engine, the exhaust gas of the engine may not be sufficiently purified because the temperature of the catalyst is lower than the activating temperature.

One approach to earlier heating of the exhaust gas is to include an electric heating system. Current systems using electrical energy are often combined within the substrate supporting an oxidation coating, known as electrically heated catalysts (EHCs). This type of system heats up the catalyst, enabling it to convert high levels of hydrocarbon/ diesel fuel and carbon monoxide at low inlet exhaust temperatures with the resultant exotherm convecting downstream, enabling earlier SCR or SCRF catalyst performance. The heating element is usually at the front of the substrate.

A problem with the current system of having the heating element in the front of the substrate is that in systems where it is desired to use a NOx storage catalyst, the heating element may heat the NOx storage catalyst and initiate a thermal release of the NOx before the downstream SCR catalyst has reached its activation temperature. This would allow the NOx to pass through the exhaust system without being reduced.

Therefore, it is desired to provide a system that provides heat to the downstream SCR while allowing NOx to continue to be stored on a NOx storage catalyst.

SUMMARY OF THE INVENTION

According to some embodiments of the present invention, an exhaust system includes a NOx storage catalyst; an electric heating element; and a NOx reduction catalyst, wherein the heating element is located downstream of the NOx storage catalyst. The electric heating element may be located directly behind the NOx storage catalyst.

In some embodiments, the NOx storage catalyst comprises a cold start catalyst, a passive NOx adsorber, and/or a NOx trap.

In some embodiments, the electric heating element is located downstream of a reductant injector. A reductant injector may be included upstream of the NOx reduction catalyst.

In some embodiments, the electric heating element is coupled with a mixer, is coupled with a hydrolysis catalyst, and/or is coupled with a selective catalytic reduction (SCR) catalyst.

In some embodiments, the NOx reduction catalyst is a selective catalytic reduction (SCR) catalyst. In some embodiments, the NOx reduction catalyst is a selective catalytic reduction filter (SCRF). The electric heating element may be located upstream of the NOx reduction catalyst. In some embodiments, the electric heating element is coupled with the NOx reduction catalyst. In some embodiments, the electric heating element and the NOx reduction catalyst are combined in a single substrate.

A system may further include an additional NOx reduction catalyst downstream of the electric heating element and NOx reduction catalyst.

In some embodiments, the exhaust system is associated with a vehicle powered by a hybrid electric motor and internal combustion engine.

According to some embodiments of the present invention, a method for treating an exhaust gas stream from an internal combustion engine includes: (a) adsorbing $NO_x$ onto a NOx storage catalyst at temperatures at or below a low temperature; (b) thermally desorbing $NO_x$ from the NOx storage catalyst at a temperature above the low temperature; (c) heating a downstream NOx reduction catalyst with an electrical heating element; and (d) catalytically removing the desorbed $NO_x$ on the NOx reduction catalyst. In some embodiments, the low temperature is between about 200° C. and about 250° C. In some embodiments, the heating element heats the NOx reduction catalyst on an intermittent pattern, while for a remainder of time the NOx is stored on the NOx storage catalyst. The NOx reduction catalyst may be heated to a temperature sufficient to activate the catalyst. In some embodiments, the electric heating element is located directly behind the NOx storage catalyst. In some embodiments, the NOx storage catalyst comprises a cold start catalyst, a passive NOx adsorber, and/or a NOx trap.

In some embodiments, the NOx reduction catalyst is an SCR catalyst or an SCRF catalyst. The electric heating element may be located upstream of the NOx reduction catalyst. In some embodiments, the electric heating element is coupled with the NOx reduction catalyst. In some embodiments, the electric heating element and the NOx reduction catalyst are combined in a single substrate. A system may further include an additional NOx reduction catalyst downstream of the electric heating element and NOx reduction catalyst.

In some embodiments, the exhaust system is associated with a vehicle powered by a hybrid electric motor and internal combustion engine.

In some embodiments, step b of the method described above comprises creating a thermal purge. The thermal purge may last, for example, less than 30 seconds. In some embodiments, a duration and timing of the thermal purge is selected to coordinate with step c of the method described above, such that NOx is released from the NOx storage catalyst when the NOx reduction catalyst is heated to a temperature sufficient to be active.

DETAILED DESCRIPTION OF THE INVENTION

Figure 1:
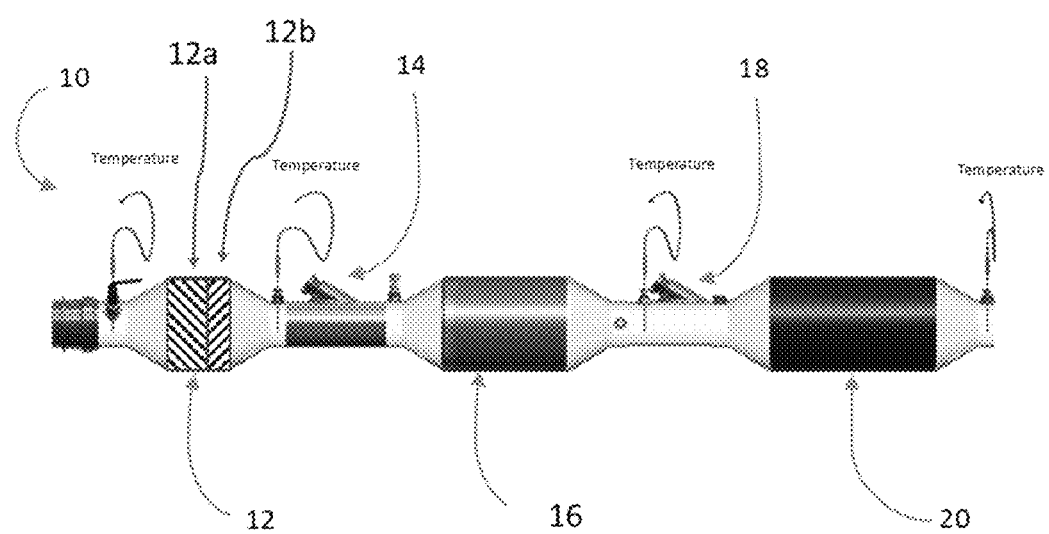
FIG. 1 depicts a system according to embodiments of the present invention.

Systems and methods of the present invention related to use of an electrical heating element downstream of a NOx storage catalyst but upstream of an SCR or SCRF catalyst, disposed on the exhaust passage of the internal combustion engine, particularly a diesel engine. The electrical heating element may be placed either directly behind the NOx storage catalyst, or de-coupled and located further downstream. For example, the electrical heating element may be placed downstream of a reductant injector, thus coupling as a mixer, hydrolysis catalyst, or a small SCR, prior to a conventional SCR or SCRF catalyst.

Systems and methods of the present invention are designed to improve overall NOx conversion of the exhaust gas purification system. In current systems including a NOx storage catalyst followed by an SCR or SCRF catalyst, it has been found that the NOx storage catalyst may release the adsorbed NOx before the SCR or SCRF catalyst has reached its activation temperature, thereby allowing NOx to be released from the exhaust system without being reduced. Similarly, existing systems with electric heating elements are configured such that the electric heating element is positioned upstream from or combined with an oxidation catalyst; when using a NOx storage catalyst behind or combined with an electric heating element, the heated NOx storage catalyst may thermally release the NOx, while the downstream SCR is not yet heated to an active temperature to reduce the NOx. Such a system would therefore be ineffective to reduce NOx emissions in the exhaust.

Currently, NOx storage coatings require a wide temperature storage window, such as from 20° C. to up 400° C., to allow a robust NOx performance overlap with a downstream SCR or SCRF catalyst. The two main reasons for the need of an extended storage window are: a) the SCR or SCRF catalyst can be located in a substantially colder location, such as an underbody location due to packaging constraints in the engine bay; and b) the energy balance of the system: the NOx storage catalyst, which typically has a lower thermal mass than an SCR or SCRF catalyst, will heat up more quickly. Therefore, the higher thermal mass SCR or SCRF catalyst remains too cold to operate, especially for situations such as the FTP emissions test where the second hill acceleration is very aggressive.

Systems and methods of the present invention address these issues, as it has been found that including an electric heating element downstream of the NOx storage catalyst but upstream of the SCR catalyst will heat up the SCR catalyst while the NOx is still stored so that the SCR catalyst is active to reduce NOx once the NOx storage catalyst releases the adsorbed NOx. By heating the SCR or SCRF catalyst while the NOx is still stored, systems and methods of the present invention may provide further advantages by: a) reducing the requirement for an expensive/high washcoat loading NOx storage catalyst (NSC); and/or b) minimizing/removing the need for rich purging of the NSC. The effect will also simplify engine calibration, as it is complex to run a diesel engine with a rich fuel/air mixture.

The combination of NOx storage catalyst and heating element as described herein may also avoid the fuel penalty and pollutant generation associated with the exotherm requirement on a conventional EHC for which the operation requires to reach the operating window of the SCR as quickly as possible to start treating NOx.

An example of a typical prior art system includes the following:

NOx Storage Catalyst (wide temp window)+SCRF+SCR

Such system may be limited by the storage capacity of the NOx storage catalyst. Once the catalyst is full or is getting fuller such that the NOx storage efficiency is not acceptable, if the SCR or SCRF catalyst is too cold to be operated, NOx is slipped to the tail pipe. Such NOx slip can be prevented if the NOx storage catalyst can be purged with a rich gas mixture (conventional NOx storage catalyst). Typically, if this operation is attempted at temperature lower than 250° C., a significant quantity of the stored NOx is not reduced and may be slipped to the tail pipe.

Systems and methods of the present invention may act to ensure that the SCR or SCRF catalyst is at an acceptable temperature and reductant injection is started prior to release of the stored NOx, thereby enabling the NOx stored on the NOx storage catalyst to be converted by SCR reactions. Further, systems and methods of the present invention may allow the design of the system to be such that the NOx storage catalyst may have a smaller and lower temperature window and therefore the attributes of this catalyst can be chosen to minimize the aging of the SCR or SCRF catalyst downstream. A conventional NOx storage catalyst will need to be desulphated with rich gas mixture at high temperature (>700° C.), however, these events will accelerate the deactivation of the SCR or SCRF catalyst during its lifetime operation. The preferred catalysts to be used in embodiments of systems and methods of the present invention will have no need for rich gas mixture desulphation or a need for rich gas mixture desulphation at temperatures <700° C., thus minimizing the deactivation of the SCR or SCRF catalyst during its lifetime operation.

Another example of a prior art system includes the following:

EHC (+engine out heat/fuel)+SCRF+SCR

Such system does not allow the storage of any NOx, and consequently this system will have no NOx removal capability at operating temperatures lower than SCR or SCRF catalyst light off. Using an EHC as described in embodiments of the present invention will minimize the risk of pollutant slip during the heat up phase by ensuring that HC light off is achieved.

Systems and methods of the present invention may preferably be used to store NOx from a cold start of the engine. However, more generally, the heating element is operated prior to the NOx being released from the NOx storage catalyst. The exact timing of when the heating element is switched on depends on the aftertreatment system calibration strategy. In some embodiments, the heating element may be used to treat NOx with the SCR or SCRF catalyst on an intermittent pattern, while for the remainder of the time the NOx is stored on the NOx storage catalyst. This operating mode may be characteristic of systems and methods of the present invention because by placing the heating element between the NOx storage catalyst and the SCR function, it gives the flexibility to use the attributes of both catalysts independently if chosen. It is not possible to do this if the heating element is placed before the NOx storage catalyst.

Upstream NOx Storage Catalyst

Systems and methods of embodiments of the present invention include a NOx storage catalyst upstream of an electric heating element. NOx storage catalysts may include devices that adsorb, release, and/or reduce NOx according to certain conditions, generally dependent on temperature and/or rich/lean exhaust conditions. NOx storage catalysts may include, for example, passive NOx adsorbers, cold start catalysts, NOx traps, and the like.

Passive NOx Adsorber

A passive $NO_x$ adsorber is a device that is effective to adsorb NOx at or below a low temperature and release the adsorbed NOx at temperatures above the low temperature. A passive $NO_x$ adsorber may comprise a noble metal and a small pore molecular sieve. The noble metal is preferably palladium, platinum, rhodium, gold, silver, iridium, ruthenium, osmium, or mixtures thereof. Preferably, the low temperature is about 200° C., about 250° C., or between about 200° C. to about 250° C. An example of a suitable passive NOx adsorber is described in U.S. Patent Publication No. 20150158019, which is incorporated by reference herein in its entirety.

The small pore molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons. Other metals (e.g., Fe, Ti, and Ga) may be incorporated into the framework of the small pore molecular sieve to produce a metal-incorporated molecular sieve.

Preferably, the small pore molecular sieve is selected from an aluminosilicate molecular sieve, a metal-substituted aluminosilicate molecular sieve, an aluminophosphate molecular sieve, or a metal-substituted aluminophosphate molecular sieve. More preferably, the small pore molecular sieve is a molecular sieve having the Framework Type of ACO, AEI, AEN, AFN, AFT, AFX, ANA, APC, APD, ATT, CDO, CHA, DDR, DFT, EAB, EDI, EPI, ERI, GIS, GOO, IHW, ITE, ITW, LEV, KFI, MER, MON, NSI, OWE, PAU, PHI, RHO, RTH, SAT, SAV, SIV, THO, TSC, UEI, UFI, VNI, YUG, and ZON, as well as mixtures or intergrowths of any two or more. Particularly preferred intergrowths of the small pore molecular sieves include KFI-SIV, ITE-RTH, AEW-UEI, AEI-CHA, and AEI-SAV. Most preferably, the small pore molecular sieve is AEI or CHA, or an AEI-CHA intergrowth.

A suitable passive $NO_x$ adsorber may be prepared by any known means. For instance, the noble metal may be added to the small pore molecular sieve to form the passive $NO_x$ adsorber by any known means. For example, a noble metal compound (such as palladium nitrate) may be supported on the molecular sieve by impregnation, adsorption, ion-exchange, incipient wetness, precipitation, or the like. Other metals may also be added to the passive $NO_x$ adsorber. Preferably, some of the noble metal (more than 1 percent of the total noble metal added) in the passive $NO_x$ adsorber is located inside the pores of the small pore molecular sieve. More preferably, more than 5 percent of the total amount of noble metal is located inside the pores of the small pore molecular sieve; and even more preferably may be greater than 10 percent or greater than 25% or greater than 50 percent of the total amount of noble metal that is located inside the pores of the small pore molecular sieve.

Preferably, the passive $NO_x$ adsorber further comprises a flow-through substrate or filter substrate. The passive $NO_x$ adsorber is coated onto the flow-through or filter substrate, and preferably deposited on the flow-through or filter substrate using a washcoat procedure to produce a passive $NO_x$ adsorber system.

Cold Start Catalyst

A cold start catalyst is a device that is effective to adsorb $NO_x$ and hydrocarbons (HC) at or below a low temperature and to convert and release the adsorbed $NO_x$ and HC at temperatures above the low temperature. Preferably, the low temperature is about 200° C., about 250° C., or between about 200° C. to about 250° C. An example of a suitable cold start catalyst is described in WO 2015085300, which is incorporated by reference herein in its entirety.

A cold start catalyst may comprise a molecular sieve catalyst and a supported platinum group metal catalyst. The molecular sieve catalyst may include or consist essentially of a noble metal and a molecular sieve. The supported platinum group metal catalyst comprises one or more platinum group metals and one or more inorganic oxide carriers. The noble metal is preferably palladium, platinum, rhodium, gold, silver, iridium, ruthenium, osmium, or mixtures thereof.

The molecular sieve may be any natural or a synthetic molecular sieve, including zeolites, and is preferably composed of aluminum, silicon, and/or phosphorus. The molecular sieves typically have a three-dimensional arrangement of $SiO_4$, $AlO_4$, and/or $PO_4$ that are joined by the sharing of oxygen atoms, but may also be two-dimensional structures as well. The molecular sieve frameworks are typically anionic, which are counterbalanced by charge compensating cations, typically alkali and alkaline earth elements (e.g., Na, K, Mg, Ca, Sr, and Ba), ammonium ions, and also protons.

The molecular sieve may preferably be a small pore molecular sieve having a maximum ring size of eight tetrahedral atoms, a medium pore molecular sieve having a maximum ring size of ten tetrahedral atoms, or a large pore molecular sieve having a maximum ring size of twelve tetrahedral atoms. More preferably, the molecular sieve has a framework structure of AEI, MFI, EMT, ERI, MOR, FER, BEA, FAU, CHA, LEV, MWW, CON, EUO, or mixtures thereof.

The supported platinum group metal catalyst comprises one or more platinum group metals ("PGM") and one or more inorganic oxide carriers. The PGM may be platinum, palladium, rhodium, iridium, or combinations thereof, and most preferably platinum and/or palladium. The inorganic oxide carriers most commonly include oxides of Groups 2, 3, 4, 5, 13 and 14 elements. Useful inorganic oxide carriers preferably have surface areas in the range 10 to 700 $m^2/g$, pore volumes in the range 0.1 to 4 mL/g, and pore diameters from about 10 to 1000 Angstroms. The inorganic oxide carrier is preferably alumina, silica, titania, zirconia, ceria, niobia, tantalum oxides, molybdenum oxides, tungsten oxides, or mixed oxides or composite oxides of any two or more thereof, e.g. silica-alumina, ceria-zirconia or alumina-ceria-zirconia. Alumina and ceria are particularly preferred.

The supported platinum group metal catalyst may be prepared by any known means. Preferably, the one or more platinum group metals are loaded onto the one or more inorganic oxides by any known means to form the supported PGM catalyst, the manner of addition is not considered to be particularly critical. For example, a platinum compound (such as platinum nitrate) may be supported on an inorganic oxide by impregnation, adsorption, ion-exchange, incipient wetness, precipitation, or the like. Other metals, such as iron, manganese, cobalt and barium, may also be added to the supported PGM catalyst.

A cold start catalyst of the present invention may be prepared by processes well known in the art. The molecular sieve catalyst and the supported platinum group metal catalyst may be physically mixed to produce the cold start catalyst. Preferably, the cold start catalyst further comprises a flow-through substrate or filter substrate. In one embodiment, the molecular sieve catalyst and the supported platinum group metal catalyst are coated onto the flow-through or filter substrate, and preferably deposited on the flow-through or filter substrate using a washcoat procedure to produce a cold start catalyst system.

NOx Traps

NOx traps are devices that adsorb NOx under lean exhaust conditions, release the adsorbed NOx under rich conditions, and reduce the released NOx to form $N_2$.

A NOx trap of embodiments of the present invention may include a NOx adsorbent for the storage of NOx and an oxidation/reduction catalyst. Typically, nitric oxide reacts with oxygen to produce $NO_2$ in the presence of the oxidation catalyst. Second, the $NO_2$ is adsorbed by the NOx adsorbent in the form of an inorganic nitrate (for example, BaO or $BaCO_3$ is converted to $Ba(NO_3)_2$ on the NOx adsorbent). Lastly, when the engine runs under rich conditions, the stored inorganic nitrates decompose to form NO or $NO_2$ which are then reduced to form $N_2$ by reaction with carbon monoxide, hydrogen, and/or hydrocarbons (or via $NH_x$ or NCO intermediates) in the presence of the reduction catalyst. Typically, the nitrogen oxides are converted to nitrogen, carbon dioxide, and water in the presence of heat, carbon monoxide, and hydrocarbons in the exhaust stream.

The NOx adsorbent component is preferably an alkaline earth metal (such as Ba, Ca, Sr, and Mg), an alkali metal (such as K, Na, Li, and Cs), a rare earth metal (such as La, Y, Pr, and Nd), or combinations thereof. These metals are typically found in the form of oxides. The oxidation/reduction catalyst may include one or more noble metals. Suitable noble metals may include platinum, palladium, and/or rhodium. Preferably, platinum is included to perform the oxidation function and rhodium is included to perform the reduction function. The oxidation/reduction catalyst and the NOx adsorbent may be loaded on a support material such as an inorganic oxide for use in the exhaust system.

Heating Element

An electrical heating element is included within the exhaust passage of the internal combustion engine, downstream of a NOx storage catalyst, and upstream of a NOx reduction catalyst. Any suitable electrical heating element may be included in the systems and methods of the present invention.

In one aspect, an electrical heating element includes an electrically heating honeycomb body having ends and power connections each disposed at a respective one of the ends. The honeycomb body may define a twisting current path over an electrically isolating gap.

In aspects where the electrical heating element is coupled with a catalyst/adsorber as described herein, electrically insulating supporting elements may fasten the honeycomb body to the at least one catalyst carrier body. Alternatively, the catalyst carrier body serving as a support for the heating element may have a catalytically active coating. For example, the catalytically active coating may promote the oxidation or reduction of constituents in the exhaust gas, in particular of carbon monoxide and hydrocarbons or reduction of NOx. The heatable honeycomb body may also be provided with such a catalytically active layer.

The catalyst carrier body and/or the honeycomb body may be formed of smooth and corrugated sheet metal layers, forming honeycombs.

The honeycomb body may have a large surface area, so that good heat transfer to the exhaust gas flowing through is ensured. The heat being generated can be transferred rapidly to the exhaust gas or a downstream component as a result and by radiation. A heating output possibly given off by radiation to a catalyst carrier body disposed upstream in the direction of the exhaust gas is in turn given off from this body to the exhaust gas, so that the full heating output is available for the downstream component.

In some aspects, the honeycomb body may be shaped in such a way that the current path has an approximately meandering or spiraling form.

In some aspects of the invention, the electrical heating element forms a single unit with a catalyst substrate. For example, the electrical heating element may form a single unit with a NOx storage catalyst. In this case, the NOx storage catalyst may be coated on the upstream end of the unit, with the electrical heating element on the downstream end of the unit. Similarly, the electrical heating element may form a single unit with a selective reduction catalyst, hydrolysis catalyst, or oxidation catalyst where the catalyst is coated on the upstream or downstream end of the unit, as desired for the particular system. Preferably, if the electrical heating element forms a single substrate with the NOx storage catalyst, the substrate will include a thermal insulation between the front (not heated) and rear (heated) zones. Generally, however, it is preferable to have the NOx storage catalyst and the heating element on two different substrates to minimize heating of the NOx storage catalyst by the electrical heating element. Alternatively, the electrical heating element may be coated entirely with a catalyst layer, such as a selective reduction catalyst, hydrolysis catalyst, or oxidation catalyst.

The electrical heating element may be a separate component from any of the other components of the system. Alternatively, the electrical heating element can be coupled as part of another component of the system, such as but not limited to, an SCR/SCRF catalyst, particulate filter, mixer, or hydrolysis catalyst.

The electrical heating element may be designed such that it can generate rapid temperature increases up to 10° C./s and preferably does not require more than 2 kw to operate. It will be preferably operated when the exhaust gas temperature entering the SCR or SCRF catalyst is above 150° C. and preferably before the temperature of the exhaust gas entering the NOx storage catalyst reaches 250° C.

Downstream NOx Reduction Catalyst

A suitable NOx reduction catalyst downstream from the heating element includes a selective catalytic reduction (SCR) catalyst or selective catalytic reduction catalyst with a filter (SCRF). An SCR catalyst is a catalyst that reduces NOx to $N_2$ by reaction with nitrogen compounds (such as ammonia or urea) or hydrocarbons (lean NOx reduction). The SCR catalyst may be comprised of a vanadia-titania catalyst, a vanadia-tungsta-titania catalyst, or a transition metal/molecular sieve catalyst. The transition metal/molecular sieve catalyst comprises a transition metal and a molecular sieve, such as an aluminosilicate zeolite or a silicoaluminophosphate.

The transition metal may be selected from chromium, cerium, manganese, iron, cobalt, nickel, and copper, and mixtures thereof. Iron and copper may be particularly preferred.

The molecular sieve may comprise a beta zeolite, a faujasite (such as an X-zeolite or a Y-zeolite, including NaY and USY), an L-zeolite, a ZSM zeolite (e.g. ZSM-5, ZSM-48), an SSZ-zeiolite (e.g., SSZ-13, SSZ-41, SSZ-33), a ferrierite, a mordenite, a chabazite, an offretite, an erionite, a clinoptilolite, a silicalite, an aluminum phosphate zeolite (including a metalloaluminophosphate, such as SAPO-34), a mesoporous zeolite (e.g., MCM-41, MCM-49, SBA-15), or mixtures thereof. Preferably, the molecular sieve may comprise a beta zeolite, a ferrierite, or a chabazite. Preferred SCR catalysts include Ci-CHA, such as Cu-SAPO-34, Cu-SSZ-13, and Fe-Beta zeolite.

Substrate

The NOx storage catalyst and the SCR catalyst may each further comprise a flow-through substrate or filter substrate. In one embodiment, the catalyst/adsorber may be coated onto the flow-through or filter substrate, and preferably deposited on the flow-through or filter substrate using a washcoat procedure The combination of an SCR catalyst and a filter is known as a selective catalytic reduction filter (SCRF catalyst). An SCRF catalyst is a single-substrate device that combines the functionality of an SCR and particulate filter, and is suitable for embodiments of the present invention as desired. Description of and references to the SCR catalyst throughout this application are understood to apply to the SCRF catalyst as well, where applicable.

The flow-through or filter substrate is a substrate that is capable of containing catalyst/adsorber components. The substrate is preferably a ceramic substrate or a metallic substrate. The ceramic substrate may be made of any suitable refractory material, e.g., alumina, silica, titania, ceria, zirconia, magnesia, zeolites, silicon nitride, silicon carbide, zirconium silicates, magnesium silicates, aluminosilicates, metallo aluminosilicates (such as cordierite and spudomene), or a mixture or mixed oxide of any two or more thereof. Cordierite, a magnesium aluminosilicate, and silicon carbide are particularly preferred.

The metallic substrates may be made of any suitable metal, and in particular heat-resistant metals and metal alloys such as titanium and stainless steel as well as ferritic alloys containing iron, nickel, chromium, and/or aluminum in addition to other trace metals.

The flow-through substrate is preferably a flow-through monolith having a honeycomb structure with many small, parallel thin-walled channels running axially through the substrate and extending throughout from an inlet or an outlet of the substrate. The channel cross-section of the substrate may be any shape, but is preferably square, sinusoidal, triangular, rectangular, hexagonal, trapezoidal, circular, or oval.

The filter substrate is preferably a wall-flow monolith filter. The channels of a wall-flow filter are alternately blocked, which allow the exhaust gas stream to enter a channel from the inlet, then flow through the channel walls, and exit the filter from a different channel leading to the outlet. Particulates in the exhaust gas stream are thus trapped in the filter.

The catalyst/adsorber may be added to the flow-through or filter substrate by any known means, such as a washcoat procedure.

Reductant/Urea Injector

When the NOx reduction catalyst is an SCR or SCRF catalyst, the exhaust system may comprise a means for introducing a nitrogenous reductant into the exhaust system upstream of the SCR or SCRF catalyst. It may be preferred that the means for introducing a nitrogenous reductant into the exhaust system is directly upstream of the SCR or SCRF catalyst (e.g. there is no intervening catalyst between the means for introducing a nitrogenous reductant and the SCR or SCRF catalyst).

The reductant is added to the flowing exhaust gas by any suitable means for introducing the reductant into the exhaust gas. Suitable means include an injector, sprayer, or feeder. Such means are well known in the art.

The nitrogenous reductant for use in the system can be ammonia per se, hydrazine, or an ammonia precursor selected from the group consisting of urea, ammonium carbonate, ammonium carbamate, ammonium hydrogen carbonate, and ammonium formate. Urea is particularly preferred.

The exhaust system may also comprise a means for controlling the introduction of reductant into the exhaust gas in order to reduce NOx therein. Preferred control means may include an electronic control unit, optionally an engine control unit, and may additionally comprise a NOx sensor located downstream of the NO reduction catalyst.

Exhaust System with After-Treatment Devices

Systems and methods of the present invention may include one or more additional after-treatment devices capable of removing pollutants from internal combustion engine exhaust gases at normal operating temperatures. The exhaust system may comprise the electrical heating element, $NO_x$ storage catalyst, and SCR/SCRF as described, as well as one or more additional catalyst components selected from: (1) SCR/SCRF catalyst, (2) a particulate filter, (3) a $NO_x$ trap (also called NOx adsorber catalyst), (4) a three-way catalyst, (5) an oxidation catalyst, or any combination thereof.

These after-treatment devices are well known in the art. As described above, selective catalytic reduction (SCR or SCRF) catalysts are catalysts that reduce $NO_x$ to $N_2$ by reaction with nitrogen compounds (such as ammonia or urea) or hydrocarbons (lean $NO_x$ reduction). A typical SCR or SCRF catalyst is comprised of a vanadia-titania catalyst, a vanadia-tungsta-titania catalyst, or a metal/zeolite catalyst such as iron/beta zeolite, copper/beta zeolite, copper/SSZ-13, copper/SAPO-34, Fe/ZSM-5, or copper/ZSM-5. Selective catalytic reduction filters (SCRF) are single-substrate devices that combine the functionality of an SCR and a particulate filter. They are used to reduce $NO_x$ and particulate emissions from internal combustion engines. In addition to the SCR catalyst coating, the particulate filter may also include other metal and metal oxide components (such as Pt, Pd, Fe, Mn, Cu, and ceria) to oxidize hydrocarbons and carbon monoxide in addition to destroying soot trapped by the filter.

NOx traps, as described above, are designed to adsorb $NO_x$ under lean exhaust conditions, release the adsorbed $NO_x$ under rich conditions, and reduce the released $NO_x$ to form $N_2$. NOx traps typically include a $NO_x$-storage component (e.g., Ba, Ca, Sr, Mg, K, Na, Li, Cs, La, Y, Pr, and Nd), an oxidation component (preferably Pt) and a reduction component (preferably Rh). These components are contained on one or more supports.

Particulate filters are devices that reduce particulates from the exhaust of internal combustion engines. Particulate filters include catalyzed particulate filters and bare (noncatalyzed) particulate filters. Catalyzed particulate filters (for diesel and gasoline applications) include metal and metal oxide components (such as Pt, Pd, Fe, Mn, Cu, and ceria) to oxidize hydrocarbons and carbon monoxide in addition to destroying soot trapped by the filter.

Three-way catalysts (TWCs) are typically used in gasoline engines under stoichiometric conditions in order to convert $NO_x$ to $N_2$, carbon monoxide to $CO_2$, and hydrocarbons to $CO_2$ and $H_2O$ on a single device.

Oxidation catalysts, and in particular diesel oxidation catalysts (DOCS), are well-known in the art. Oxidation catalysts are designed to oxidize CO to $CO_2$ and gas phase hydrocarbons (HC) and an organic fraction of diesel particulates (soluble organic fraction) to $CO_2$ and $H_2O$. Typical oxidation catalysts include platinum and optionally also palladium on a high surface area inorganic oxide support, such as alumina, silica-alumina and a zeolite.

EXEMPLARY EMBODIMENTS

[NOxStorage][EHC]-(Reductant)-[SCR/SCRF]
The NOx storage catalyst and the electrical heating element may be coupled. In such embodiments, the heating element is installed directly behind (downstream of) the NOx storage catalyst. The heating element may be combined within the same substrate as the NOx storage catalyst, or may be installed separately from the NOx storage catalyst but closely positioned. Downstream from the heating element, the system may include a reductant injector followed by an SCR and/or SCRF catalyst. Optionally, the system may additionally include (1) SCR/SCRF catalyst, (2) a particulate filter, (3) a NOx trap (also called NOx adsorber catalyst), (4) a three-way catalyst, (5) an oxidation catalyst, or any combination thereof.

[NOxStorage]-[Reductant Injector]-[EHC]-[SCR/SCRF]
The NOx storage catalyst and the heating element may be de-coupled. In such embodiments, the heating element may be located downstream of a reductant injector and/or other components. An SCR and/or SCRF catalyst may then be located downstream of the reductant injector and the heating element. In such set-ups, the heating element may be coupled with a mixer, hydrolysis catalyst, or small SCR/SCRF catalyst. Optionally, the system may additionally include (1) SCR/SCRF catalyst, (2) a particulate filter, (3) a $NO_x$ trap (also called NOx adsorber catalyst), (4) a three-way catalyst, (5) an oxidation catalyst, or any combination thereof.

[NOxStorage]-[Reductant Injector]-[EHC][SCR/SCRF]
The electrical heating element and the SCR/SCRF catalyst may be coupled. In such embodiments, the heating element may be installed directly upstream of the SCR/SCRF catalyst. The heating element may be combined within the same substrate as the SCR/SCRF catalyst or may be installed separately by closely positioned. The electrical heating element may form a single unit with the SCR/SCRF catalyst. The SCR/SCRF catalyst may be coated on the downstream end of the unit, with the electrical heating element on the upstream end of the unit. Alternatively, the electrical heating element may be coated entirely with an SCR catalyst layer. The electric heating element/SCR/SCRF unit is located downstream of the NOx storage catalyst and the reductant injector. Optionally, the system may additionally include (1) SCR/SCRF catalyst, (2) a particulate filter, (3) a $NO_x$ trap (also called NOx adsorber catalyst), (4) a three-way catalyst, (5) an oxidation catalyst, or any combination thereof.

The system may include a NOx storage catalyst, followed by a reductant injector. An electrical heating element/SCR (F) catalyst unit is located downstream. The electrical heating element may form a single unit with the SCR/SCRF catalyst; the SCR/SCRF catalyst may be coated on the downstream end of the unit, with the electrical heating element on the upstream end of the unit, or alternatively, the electrical heating element may be coated entirely with an SCR catalyst layer to form the unit. A reduction injector is located downstream from the unit, followed by the SCR(F) catalyst.

Referring to FIG. 1, system 10 may include NOx storage catalyst 12a and heating element 12b. The NOx storage catalyst 12a and the heating element 12b is coupled to form a single unit 12, which is followed by reductant injector 14. A SCR(F) catalyst unit 16 is located downstream. Reductant injector 18 is located downstream from unit 16, followed by SCR(F) catalyst 20.

Method

The present invention also includes a method for treating exhaust gas from an internal combustion engine. The method comprises adsorbing $NO_x$ onto the NOx storage catalyst at temperatures at or below a low temperature, thermally desorbing $NO_x$ from the NOx storage catalyst at a temperature above the low temperature, heating a downstream NOx reduction catalyst with an electrical heating element, and catalytically removing the desorbed $NO_x$ on the NOx reduction catalyst. Preferably, the low temperature is about 200° C., about 250° C., or between about 200° C. and 250° C.

Further the exhaust gas may be treated with additional catalyst components downstream of the NOx storage catalyst, including additional SCR/SCRF catalyst, particulate filter, a $NO_x$ adsorber catalyst, a three-way catalyst, an oxidation catalyst, or combinations thereof.

The electrical heating element may generate rapid temperature increases up to 10° C./s and preferably does not require more than 2 kw to operate. It will be preferably operated when the exhaust gas temperature entering the SCR or SCRF catalyst is below 150° C. and preferably before the temperature of the exhaust gas entering the NOx storage catalyst reaches 250° C.

Generally, the heating element is operated prior to the NOx being released from the NOx storage catalyst. The exact timing of when the heating element is switched on depends on the aftertreatment system calibration strategy. The heating element may be used to treat NOx with the SCR or SCRF catalyst on an intermittent pattern, while for the remainder of the time the NOx is stored on the NOx storage catalyst. This operating mode may be characteristic of systems and methods of the present invention because by placing the heating element between the NOx storage catalyst and the SCR function, it gives the flexibility to use the attributes of both catalysts independently if chosen. It is not possible to do this if the heating element is placed before the NOx storage catalyst.

Systems of the present invention may also provide additional advantages in a vehicle powered by a hybrid electric motor and internal combustion engine. In such a vehicle, during an increase of requested power and when the exhaust gas temperature of the SCR is below light-off temperature, a proportion of the requested power is obtained from the electric motor in order to: a) reduce the exhaust gas temperature increase and thereby reduce release of NOx from the NOx storage catalyst prior to the EHC heating up of the downstream SCR catalyst; and b) improve the heat up of the SCR during the EHC heating mode because of the lower exhaust gas mass flow rate, compared to a vehicle using only engine power.

The present invention also includes a method which combines the heating phase of the EHC with a thermal purging of the storage catalyst. It has been found that NOx may be desorbed from a NOx storage catalyst by creating a short thermal purge. The short thermal purge may be similar to conditions used for CSF soot regeneration or near to lambda 1 operating mode, and has been found to be very efficient at releasing NOx. In some embodiments the thermal purge may last less than 30 seconds, less than 25 seconds, less than 20 seconds, less than 15 seconds, less than 10 seconds, less than 5 seconds, about 1 second to about 30 seconds, about 5 seconds to about 25 seconds, or about 10 second to about 20 seconds.

By planning the thermal purge at a given time, one can trigger EHC heating to heat up the SCR(F) at the desired time and for the required duration to ensure optimized overlap between NOx release and SCR(F) operation, meaning that the temperature of the catalyst will be high enough for urea injection and high NOx conversion.

In some embodiments of the invention, a system includes a heating element followed by a high thermal mass/low conductivity part, such as metallic substrate or filter substrate, comprising for example, aluminum titanate, cordierite, and/or silicon carbide. The addition of the high thermal mass/low conductivity part may provide additional benefits to the system, because the heated part would allow for less strict coordination of EHC heating and active NOx release from NOx storage catalyst.

The following examples merely illustrate the invention; the skilled person will recognize many variations that are within the spirit of the invention and scope of the claims.

EXAMPLES

Example 1

Temperature and NOx accumulative mass difference were measured as a function of time in a system including PNA/dCSC+SCR-EHC+SCRF. The results in FIG. 1 demonstrate the typical mismatch between the NOx adsorber and the downstream NOx reduction catalyst. The NOx adsorber is releasing NOx at a temperature of about 250° C., however, the NOx reduction catalyst will not be effective at this temperature, and would effectively miss the first release of NOx.

Tests were run to determine temperature and NOx cumulative mass as a function of time in systems with and without heating. Exhaust gases were sampled over the PNA/dCSC and between the PNA/dCSC and the post SCRF position, with and without heating.

Figure 2:
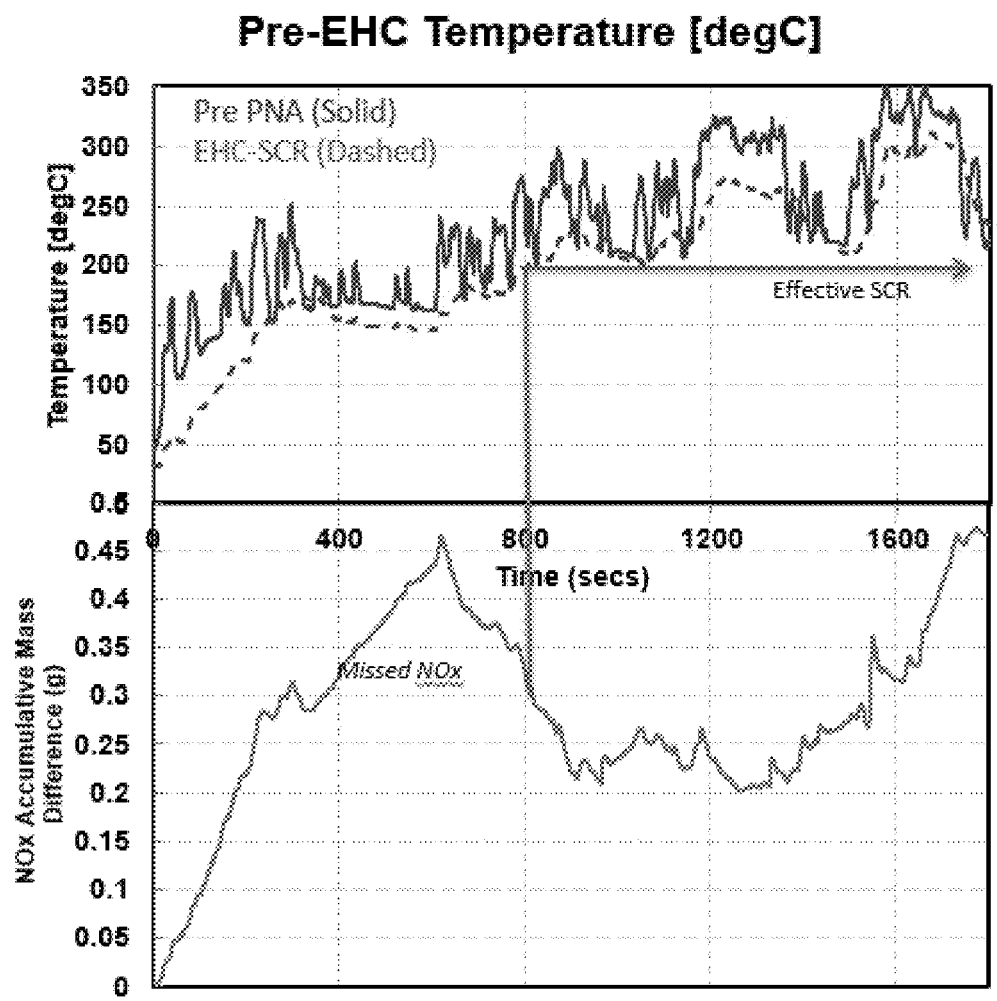
FIG. 2 shows temperature and NOx cumulative mass difference as a function of time.
Figure 3:
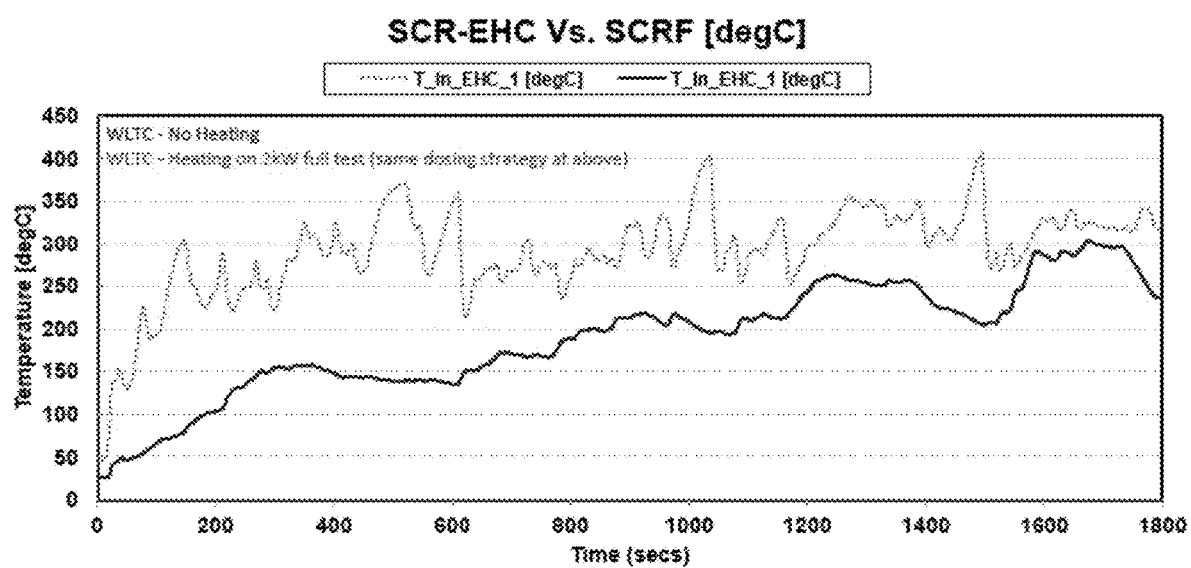
FIG. 3 shows temperature of systems with and without heating as a function of time.

The results are shown in FIGS. 2 and 3. In FIG. 2, the temperature measured post EHC-SCR is highlighted, whereby operation with and without the EHC heating mode is depicted. The addition of heat by way of the EHC ensures that the activity of the NOx reduction catalyst (SCR) can be triggered earlier than without the addition of heat. In FIG. 3, the benefits of this heat are measured by way of a reduction in the cumulative NOx measured after the system previously described when the EHC is operated (specifically in this test at 2 kW of power).

Example 2

This example examines whether it is possible to control the NOx storage-release characteristics of the PNA by thermal management (engine heat) and furthermore, whether the EHC-SCR can be used to capture the thermal release of NOx from the NOx storage catalyst.

A system was tested which included the following configuration: NOx storage catalyst, reductant injector, electrical heating element/SCR, reductant injector, SCRF, SCR. The test cycle was the ECE portion of the NEDC, whereby every fourth ECE a lean purge is triggered. The lean purge cleaning of the NOx storage catalyst included a 15 second lean purge (lambda 1.1) using engine de NOx mode. For the lean purge cleaning of the NOx storage catalyst+electrical heating element/SCR, in advance of the 15 second lean purge, heating of 1.5 kW was started 50 second prior to the purge, for a duration of 60 seconds.

Measurements were taken over the PNA/dCSC to understand storage and release characteristics. A urea injection rate of alpha 5 (ammonia to NOx ratio) into the EHC-SCR was then applied over two tests, one without EHC heating and one with.

Figure 4:
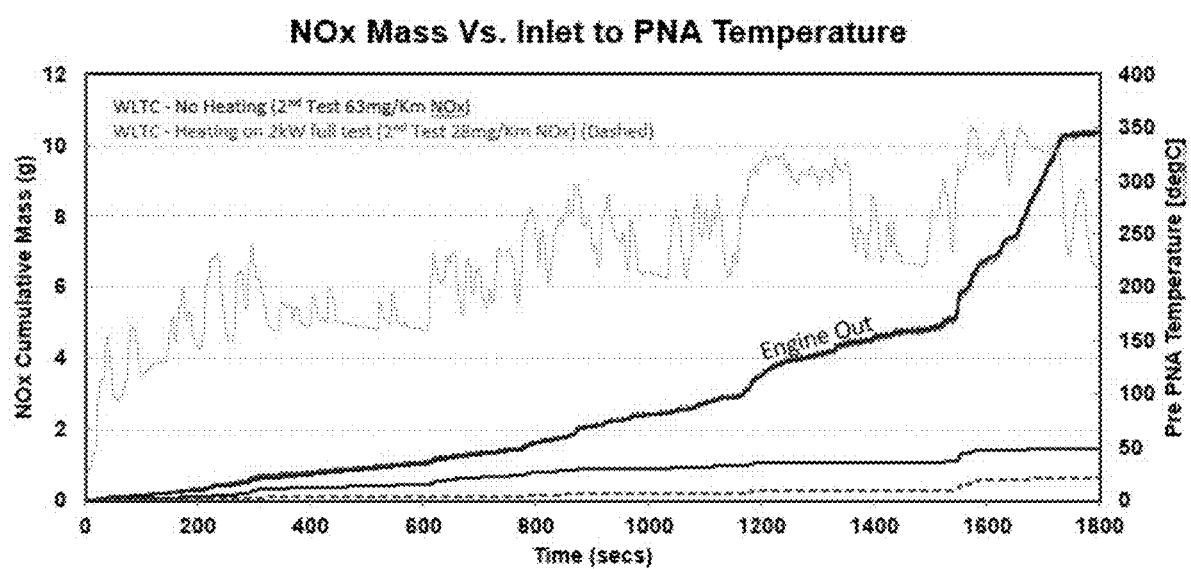
FIG. 4 shows NOx cumulative mass of systems with and without heating as a function of time.
Figure 5:
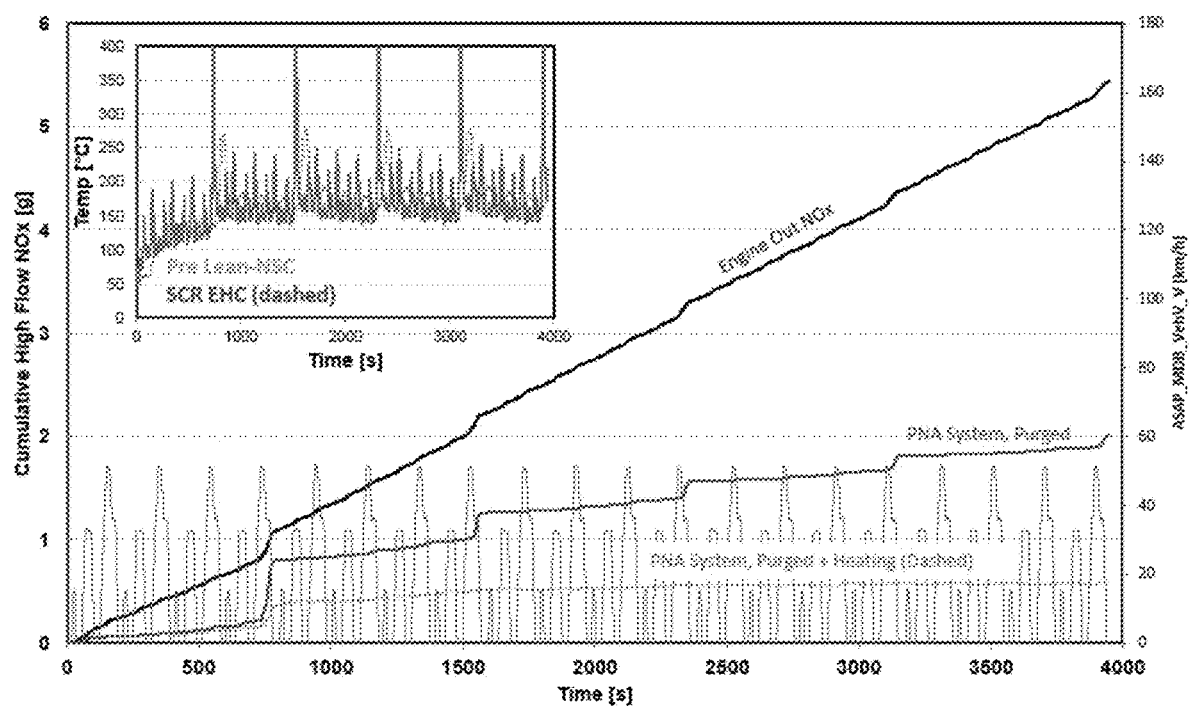
FIG. 5 shows temperature and NOx cumulative NOx of systems with and without heating as a function of time.

The results are shown in FIG. 4. Here, the cumulative NOx mass from the engine is compared to the post aftertreatment systems with and without heating. Whereby the release of NOx from the PNA/dCSC is controlled thermally by way of a deNOx purge (lambda near to 1). The addition of strategic heating as previously described results in a reduction of NOx sampled after the aftertreatment system. It is therefore demonstrated that a strategic approach to heating the EHC-SCR can be coupled with engine modes to release NOx from the PNA/dCSC, resulting in an increase in NOx conversion from the aftertreatment system.

We claim:

1. An exhaust system comprising:
   a. a NOx storage catalyst comprising a cold start catalyst or a passive NOx adsorber;
   b. an electric heating element; and
   c. a NOx reduction catalyst
   wherein the electric heating element is located directly behind the NOx storage catalyst and upstream of the NOx reduction catalyst, and the electric heating element is coupled with the NOx storage catalyst to form a single unit.

2. A method for treating an exhaust gas stream from an internal combustion engine by an exhaust system, comprising:
   a. adsorbing $NO_x$ onto a NOx storage catalyst at temperatures at or below a low temperature;
   b. heating the NOx storage catalyst with an electrical heating element to thermally desorb $NO_x$ from the NOx storage catalyst at a temperature above the low temperature;
   c. catalytically removing the desorbed $NO_x$ on the NOx reduction catalyst;
   wherein the exhaust system comprises the electric heating element which is located directly behind the NOx storage catalyst and upstream of the NOx reduction catalyst, and which is coupled with the NOx storage catalyst to form a single unit, and
   wherein the NOx storage catalyst comprises a cold start catalyst or a passive NOx adsorber.

3. The method of claim 2, wherein the low temperature is between about 200° C. and about 250° C.

4. The method of claim 2, wherein the NOx reduction catalyst is heated to a temperature sufficient to activate the catalyst.

5. The method of claim 2, wherein a duration and timing of the electrical heating is selected to coordinate with step c, such that NOx is released from the NOx storage catalyst when the NOx reduction catalyst is heated to a temperature sufficient to be active.

* * * * *